United States Patent
Mizutani

(10) Patent No.: US 6,676,565 B2
(45) Date of Patent: Jan. 13, 2004

(54) APPARATUS AND METHOD FOR CONTROLLING AUTOMATIC STOP OF INTERNAL COMBUSTION ENGINE

(75) Inventor: Koichi Mizutani, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/196,230

(22) Filed: Jul. 17, 2002

(65) Prior Publication Data

US 2003/0022755 A1 Jan. 30, 2003

(30) Foreign Application Priority Data

Jul. 26, 2001 (JP) ........................ 2001-225875

(51) Int. Cl.⁷ .............................................. B60K 41/04
(52) U.S. Cl. ...................................................... 477/111
(58) Field of Search ................... 477/107, 111, 477/112, 113, 102; 123/179.4; 701/112

(56) References Cited

U.S. PATENT DOCUMENTS

| 4,500,794 A | * | 2/1985 | Hamano et al. | .......... 290/38 C |
|---|---|---|---|---|
| 4,630,577 A | * | 12/1986 | Cornacchia | .............. 123/179.3 |
| 5,653,659 A | * | 8/1997 | Kunibe et al. | .............. 477/111 |
| 6,190,284 B1 | * | 2/2001 | Kuroda et al. | .............. 477/107 |
| 6,371,889 B1 | * | 4/2002 | Kuroda et al. | .............. 477/181 |
| 6,434,475 B2 | * | 8/2002 | Kaneko et al. | ............. 701/112 |
| 6,494,809 B1 | * | 12/2002 | Suzuki et al. | ............... 477/107 |

FOREIGN PATENT DOCUMENTS

| JP | A 6-257483 | 9/1994 |
|---|---|---|
| JP | A 10-77937 | 3/1998 |
| JP | A 11-122713 | 4/1999 |
| JP | A 2000-337188 | 12/2000 |

\* cited by examiner

*Primary Examiner*—Ankur Parekh
(74) *Attorney, Agent, or Firm*—Oliff & Berridge, PLC

(57) ABSTRACT

An electric control apparatus (ECU) permits an automatic stop of an engine if there is vehicle speed historical data after the start of the engine when a predetermined automatic stop condition is satisfied. Even if there is no vehicle speed historical data, the ECU permits the automatic stop of the engine when the shift position of an automatic transmission is the parking position. Therefore, the frequency of the automatic stop of the engine is increased, which improves fuel efficiency.

30 Claims, 4 Drawing Sheets

APPARATUS AND METHOD FOR CONTROLLING AUTOMATIC STOP OF INTERNAL COMBUSTION ENGINE

BACKGROUND OF THE INVENTION

The present invention relates to an apparatus and a method for controlling automatic stop of an internal combustion engine. Particularly, the present invention pertains to a technique that automatically stops an internal combustion engine if the engine is running under a predetermined running state when the vehicle is not running.

An economy running system (hereinafter referred to as an eco-run system) is adapted to a prior-art internal combustion engine of a vehicle. The system automatically stops the engine when the vehicle is not running, which improves fuel economy. The system automatically stops the engine when the vehicle stops, for example, at an intersection, and automatically starts the engine by rotating a starter motor, such that the engine is automatically started to start the vehicle, when the vehicle is operated to start. Japanese Laid-Open Patent Publication No. 2000-337188 discloses the above-mentioned eco-run system. The system prohibits the automatic stop of the engine if there is no historical data indicating that the vehicle has moved after the engine is started. Accordingly, the frequency of the automatic stop of the engine is reduced, which prevents the performance of the battery from being deteriorated by insufficient charge and deters deterioration of the starter motor.

The system disclosed in the publication, however, always prohibits the automatic stop of the engine if there is no traveling historical data after the start of the engine. Therefore, fuel economy cannot be improved.

SUMMARY OF THE INVENTION

Accordingly, it is an objective of the present invention to provide an apparatus and a method for controlling automatic stop of an internal combustion engine that increases the frequency of the automatic stop of the engine, thereby improving fuel economy.

To achieve the above objective, the present invention provides an automatic stop controlling apparatus for automatically stopping an engine. The engine is mounted on a vehicle and is coupled to an automatic transmission. The automatic transmission has a plurality of shift positions. The apparatus includes a sensor for detecting the state of the vehicle, and a controller for controlling the engine. When it is judged that predetermined automatic stop conditions are satisfied based on the state of the vehicle, the controller stops the engine. The controller changes the automatic stop conditions in accordance with the shift position of the automatic transmission. The automatic stop condition to be changed is related to at least one of traveling historical data of the vehicle and the road condition.

The present invention also provides a method for controlling an automatic stop of an engine. The engine is mounted on a vehicle and is coupled to an automatic transmission. The automatic transmission has a plurality of shift positions. The method includes detecting the state of the vehicle, stopping the engine when it is judged that predetermined automatic stop conditions are satisfied based on the detected state of the vehicle, and changing the automatic stop conditions in accordance with the shift position of the automatic transmission. The automatic stop condition to be changed is related to at least one of traveling historical data of the vehicle and the road condition.

The present invention further provides a medium, which is readable by a computer and has within it a program for automatically stopping an engine. The engine is mounted on a vehicle and is coupled to an automatic transmission. The automatic transmission has a plurality of shift positions. The program causes the computer to execute the following procedures: detecting the state of the vehicle; stopping the engine when it is judged that predetermined automatic stop conditions are satisfied based on the detected state of the vehicle; and changing the automatic stop conditions in accordance with the shift position of the automatic transmission. The automatic stop condition to be changed is related to at least one of traveling historical data of the vehicle and the road condition.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
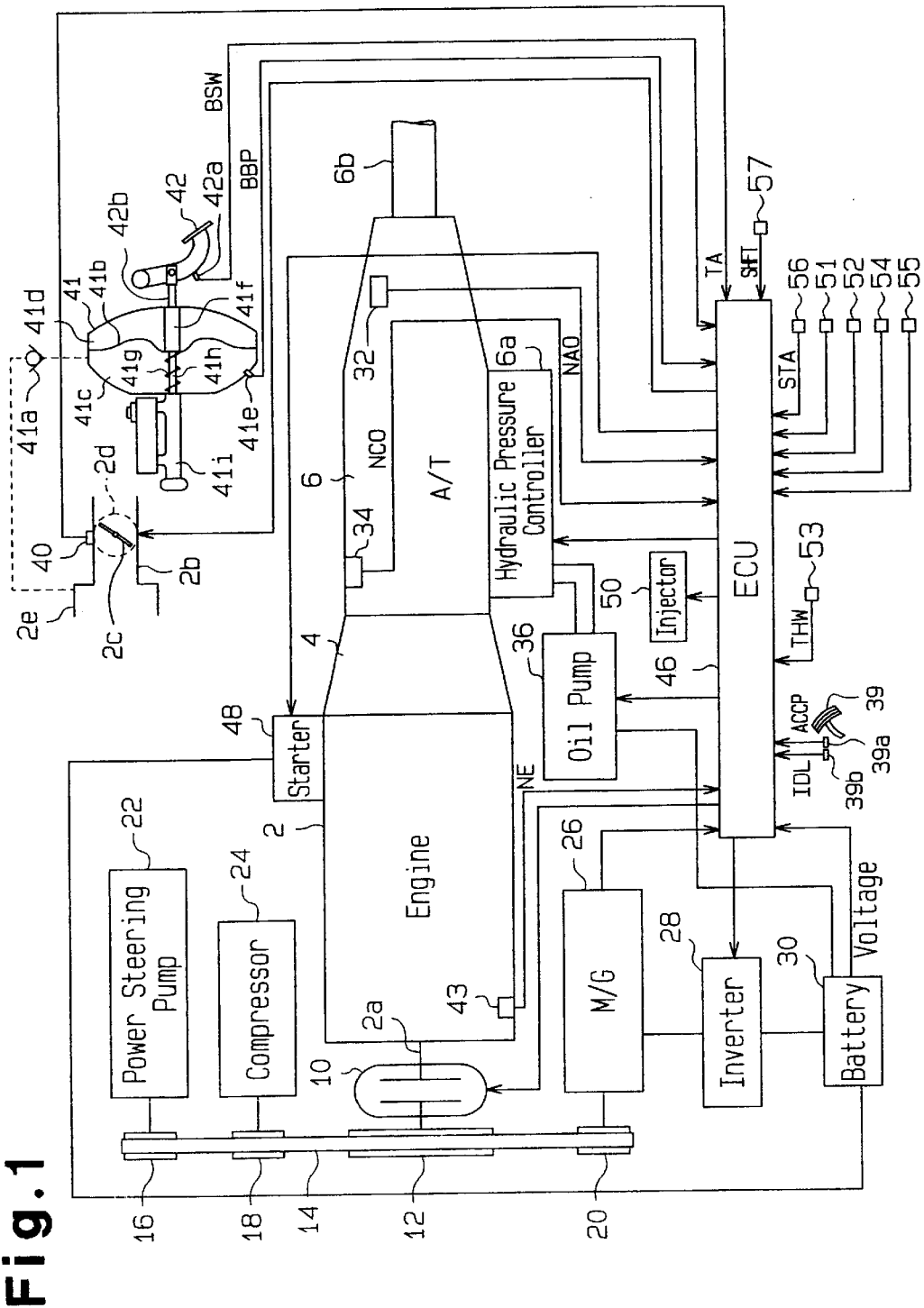
FIG. 1 is a schematic diagram illustrating a system of an engine and a controller according to a first embodiment of the present invention.

A first embodiment of the present invention will now be described with reference to FIGS. 1 to 4. FIG. 1 is a schematic diagram illustrating a system of an internal combustion engine and a controller. The engine is, for example, a six-cylinder gasoline engine 2. The engine 2 is used for driving a vehicle.

Rotational torque of the engine 2 is transmitted to an output shaft 6b through a crankshaft 2a of the engine 2, a torque converter 4 and an automatic transmission 6 (hereinafter referred to as an A/T). Rotational torque is then transmitted to vehicle wheels.

Rotational torque of the engine is also transmitted to a belt 14 through an electromagnetic clutch 10, which is coupled to the crankshaft 2a, and a pulley 12. Rotational torque that is transmitted to the belt 14 rotates pulleys 16, 18, 20. The electromagnetic clutch 10 selectively transmits power from the crankshaft 2a to the pulley 12.

A power steering pump 22 is driven by rotational torque that is transmitted through the pulley 16, and generates hydraulic pressure to actuate a power steering. A compressor 24 in an air conditioner is driven by rotational torque that is transmitted through the pulley 18.

A motor-generator 26 (hereinafter referred to as M/G) is driven by rotational torque that is transmitted through the pulley 20. At this time, the M/G 26 functions as a generator.

The M/G 26 is electrically connected to an inverter 28. The inverter 28 drives the M/G 26 to charge a battery 30, which serves as a power source, in accordance with a generating command from an electric control apparatus (hereinafter referred to as an ECU) 46. When the engine 2 is not running, the M/G 26 functions as a motor in accordance with a control signal from the inverter 28. At this time, the inverter 28 adjusts electric energy supplied from the battery 30 to the M/G 26, which controls the speed of the M/G 26.

The A/T 6 includes an oil pump, which is actuated by power of the engine 2. The oil pump supplies oil to a hydraulic pressure controller 6a. A control valve in the hydraulic pressure controller 6a controls oil supplied to clutches, brakes and one-way clutches (not shown) in the A/T 6. The speed NAO of the output shaft 6b of the A/T 6 is detected by an output shaft speed sensor 32. The turbine speed NCO, or the speed of an input shaft, of the A/T 6 is detected by a turbine speed sensor 34. An electric oil pump 36 also supplies oil to the hydraulic pressure controller 6a of the A/T 6. Therefore, when the engine 2 is not running, the clutches, brakes and one-way clutches of the A/T 6 are set to a necessary condition by actuating the electric oil pump 36.

A throttle valve 2c is located in an intake passage 2b of the engine 2 and adjusts the flow rate of air that is drawn into the engine 2. The throttle valve 2c is actuated by a throttle valve motor 2d. The opening degree of the throttle valve 2c is adjusted such that the opening degree of the throttle valve 2c (throttle opening degree TA) detected by a throttle opening degree sensor 40 corresponds to the depression degree of an acceleration pedal 39 (acceleration pedal depression degree ACCP) detected by an acceleration pedal sensor 39a. An idle switch 39b is also located in the acceleration pedal 39 and outputs an idle signal IDL when the acceleration pedal 39 is not depressed.

A surge tank 2e is located downstream of the throttle valve 2c in the intake passage 2b. The negative pressure in the surge tank 2e is supplied to a brake booster 41 by way of a check valve 41a. The brake booster 41 increases depression force of a brake pedal 42. The brake booster 41 includes two pressure chambers 41c, 41d defined by a diaphragm 41b. A brake booster pressure sensor 41e is located in the first pressure chamber 41c and detects the brake booster pressure in the first pressure chamber 41c to output a signal corresponding to the brake booster pressure in the first pressure chamber 41c. A brake switch 42a is located in the brake pedal 42 and outputs a signal representing a depressing state BSW of the brake pedal 42. That is, when the brake pedal 42 is not depressed, the brake switch 42a outputs an off signal. When the brake pedal 42 is depressed, the brake switch 42a outputs an on signal.

The intake negative pressure is supplied from the surge tank 2e into the first pressure chamber 41c of the brake booster 41 by way of the check valve 41a. The check valve 41a permits air to flow from the first pressure chamber 41c into the surge tank 2e and limits the reverse flow.

The brake booster 41 functions as follows. When the brake pedal 42 is not depressed, a negative pressure control valve 41f in the brake booster 41 introduces negative pressure in the first pressure chamber 41c into the second pressure chamber 41d. This equalizes the negative pressures in the first pressure chamber 41c and the second pressure chamber 41d, and the diaphragm 41b is pushed back toward the brake pedal 42 by the urging force of a spring 41g. Accordingly, a push rod 41h connected to the diaphragm 41b does not push a piston (not shown) in a master cylinder 41i.

When the brake pedal 42 is depressed, the negative pressure control valve 41f connected to the input rod 42b of the brake pedal 42 closes the first pressure chamber 41c from the second pressure chamber 41d, and the atmospheric air is drawn into the second pressure chamber 41d. This generates a pressure difference between the pressure in the first pressure chamber 41c, which is the intake negative pressure, and the pressure in the second pressure chamber 41d, which is equal to the atmospheric pressure. Therefore, the depression force of the brake pedal 42 is increased, and the diaphragm 41b pushes the push rod 41h into the master cylinder 41i against the urging force of the spring 41g. The piston in the master cylinder 41i is then pushed to apply the brakes.

When the brake pedal 42 is released, the negative pressure control valve 41f connected to the input rod 42b of the brake pedal 42 closes the second pressure chamber 41d from air and communicates the first pressure chamber 41c with the second pressure chamber 41d. In this case, the intake negative pressure is introduced from the first pressure chamber 41c into the second pressure chamber 41d. The pressure in the first pressure chamber 41c becomes equal to the pressure in the second pressure chamber 41d. Therefore, the diaphragm 41b moves toward the brake pedal 42 by the urging force of the spring 41g, which releases the brakes.

The ECU 46 inputs signals from the output shaft speed sensor 32, the turbine speed sensor 34, the pedal sensor 39a, the idle switch 39b, and the throttle opening degree sensor 40, respectively. The ECU 46 also inputs a signal from a shift lever position sensor 57, which detects a shift position SHFT of the A/T 6. The ECU 46 inputs signals from an engine speed sensor 43, which detects the engine speed NE, the brake switch 42a, and an eco-run switch 51, which is operated by the driver to actuate an economy running system (hereinafter referred to as an eco-run system), respectively. The eco-run system is a driving control system that stops the engine 2 by cutting fuel supply to the engine 2 when the vehicle stops, for example, at an intersection, to improve fuel economy and reduce exhaust gas.

The ECU 46 inputs signals from an air conditioner switch 52, which actuates the air conditioner, the brake booster pressure sensor 41e, a coolant temperature sensor 53, which detects the coolant temperature THW, an inclination sensor 54, which detects the inclination of the vehicle, a slip detecting sensor 55, which detects the slip of the wheels, respectively. The ECU 46 also reads voltage of the battery 30.

The main part of the ECU 46 includes a microcomputer. The microcomputer includes a ROM and a RAM. The ECU 46 executes various computations in accordance with the programs stored in the ROM. Based on the results of the computation, the ECU 46 actuates the throttle valve motor 2d, the hydraulic pressure controller 6a, the electromagnetic clutch 10, the inverter 28, the electric oil pump 36, a starter 48, a fuel injector 50 and an igniter, respectively. Accordingly, the engine 2 and the A/T 6 are controlled. The starter 48 is driven by the battery 30 to start the engine 2 by cranking. The fuel injector 50 injects fuel into each of multiple combustion chambers of the engine 2.

In the normal start of the engine 2, when the start signal STA is input from a key switch 56 in accordance with the operation of the ignition key, the ECU 46 drives the starter 48 to start the engine 2 by cranking.

As the eco-run switch 51 is turned on, the ECU 46 executes an automatic stop procedure and an automatic start procedure based on the running state of the vehicle.

In the automatic stop procedure of the engine 2, the ECU 46 judges whether automatic stop conditions are satisfied based on the running state of the vehicle. The running state of the vehicle includes the coolant temperature THW, which is detected by the coolant temperature sensor 53, the depression state of the acceleration pedal 39, which is detected by the idle switch 39b, the voltage of the battery 30, the depression state of the brake pedal 42, which is detected by the brake switch 42a, the vehicle speed SPD, which is computed based on the detection value NAO of the output shaft speed sensor 32 and the brake booster pressure (negative pressure), which is detected by the brake booster pressure sensor 41e. Following conditions (1) to (6) are included in the automatic stop conditions.

Condition (1) refers to a state of the engine 2 in which the engine 2 is warm and is not overheated (the coolant temperature THW is lower than an upper limit value THWmax and higher than a lower limit value THWmin).

Condition (2) refers to a state in which the acceleration pedal 39 is not depressed (the idle switch 39b is on).

Condition (3) refers to a state in which the charge level of the battery 30 is equal to or greater than a predetermined level (the voltage of the battery 30 is equal to or greater than a referential level).

Condition (4) refers to a state in which the brake pedal 42 is depressed (the brake switch 42a is on).

Condition (5) refers to a state in which the vehicle is not moving (the vehicle speed SPD is 0 km/h).

Condition (6) refers to a state in which the absolute value of the negative pressure in the brake booster 41 is equal to or greater than a predetermined value (the brake booster 41 assists the depression force of the brake pedal 42).

When conditions (1) to (6) are satisfied, the ECU 46 judges that the automatic stop conditions are satisfied.

When the automatic stop conditions are satisfied, the ECU 46 permits the engine 2 to be automatically stopped if the there is historical data regarding the vehicle speed after the start of the engine 2. The ECU 46 permits or limits the automatic stop of the engine 2 based on the position of the A/T 6 if there is no vehicle speed historical data. When the vehicle speed SPD is equal to or higher than a predetermined value, the vehicle is determined to have the vehicle speed historical data. The ECU 46 permits the automatic stop of the engine 2 when the shift position of the A/T 6 is the parking position. When the position of the A/T 6 is the parking position, the vehicle remains stopped even if the brake booster 41 assists the brake pedal 42. The ECU 46 limits the automatic stop of the engine 2 when the position of the A/T 6 is the neutral position. As the negative pressure of the brake booster 41 decreases, the assisting force to the brake pedal 42 is reduced when the position of the A/T 6 is the neutral position. Therefore, the ECU 46 limits the automatic stop of the engine 2 and keeps the engine 2 running to increase the negative pressure.

When the automatic stop conditions are satisfied and the automatic stop is permitted, the ECU 46 executes the engine stop procedure. For example, the ECU 46 stops the engine 2 by stopping the fuel injection by the fuel injector 50 and the ignition by the ignition plug.

In the automatic start procedure of the engine 2, the ECU 46 judges whether the automatic start conditions are satisfied based on the running state of the vehicle. The coolant temperature THW, the depression state of the acceleration pedal 39, the voltage of the battery 30, the depression state of the brake pedal 42 and the vehicle speed SPD are included in the running state of the vehicle. The ECU 46 judges that the automatic start conditions are satisfied when one or more of the automatic stop conditions (1) to (5) are not satisfied after the engine 2 is stopped by the automatic stop procedure. In addition to the conditions (1) to (5), other conditions may be considered to judge whether the automatic start conditions are satisfied. Alternatively, one or more conditions may be deleted from the conditions (1) to (5).

The ECU 46 executes the automatic start procedure of the engine 2 when one or more conditions (1) to (5) are not satisfied after the engine 2 is stopped by the automatic stop procedure. In the automatic start procedure, the ECU 46 connects the electromagnetic clutch 10 and commands the inverter 28 to drive the M/G 26 to rotate the crankshaft 2a of the engine 2 compulsory, which starts the engine 2 by cranking. When the engine speed NE reaches a predetermined value, the ECU 46 executes the fuel injection procedure and the ignition timing control procedure to automatically start the engine 2. The ECU 46 starts the fuel injection amount control procedure, the ignition timing control procedure and other procedures, which are executed in the normal condition of the engine 2, after the automatic start of the engine 2 is completed.

The automatic stop procedure and the automatic start procedure of the engine 2, which are executed by the ECU 46 will now be described. The automatic stop procedure and the automatic start procedure of the engine 2 are executed when the eco-run switch 51 is turned on.

Figure 2:
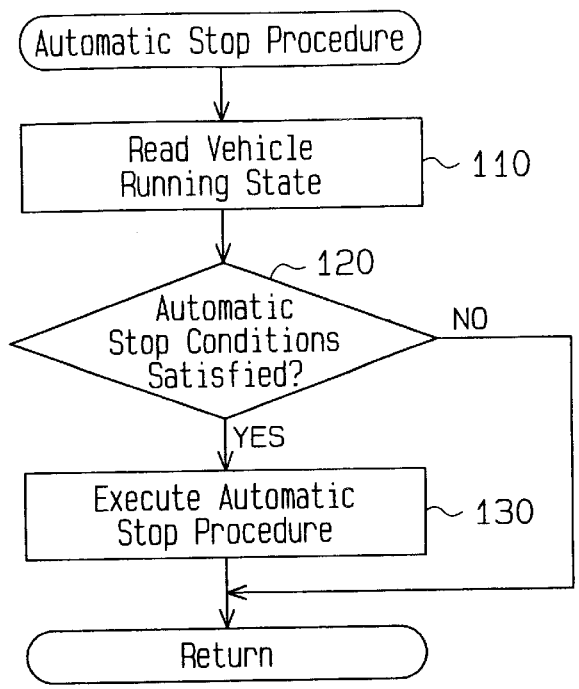
FIG. 2 is a flowchart showing an automatic stop procedure executed by the ECU shown in FIG. 1.

FIG. 2 is a flowchart illustrating the automatic stop procedure. The procedure is executed at predetermined short intervals. When the automatic stop procedure is started, in step 110, the ECU 46 stores the running state in the RAM to judge whether the automatic stop conditions are satisfied. As above described, the coolant temperature THW, the depression state of the acceleration pedal 39, the voltage of the battery 30, the depression state of the brake pedal 42, the vehicle speed SPD and the brake booster pressure are included in the running state of the vehicle.

In step 120, the ECU 46 judges whether the automatic stop conditions are satisfied based on the running state. The ECU 46 judges that the automatic stop conditions are satisfied when all of the conditions (1) to (6) are satisfied, and proceeds to step 130. In step 130, the ECU 46 executes the automatic stop procedure of the engine 2. When one or more of the conditions (1) to (6) are not satisfied, the ECU 46 judges that the automatic stop conditions are not satisfied and, thereafter, temporarily suspends the procedure.

Figure 4:
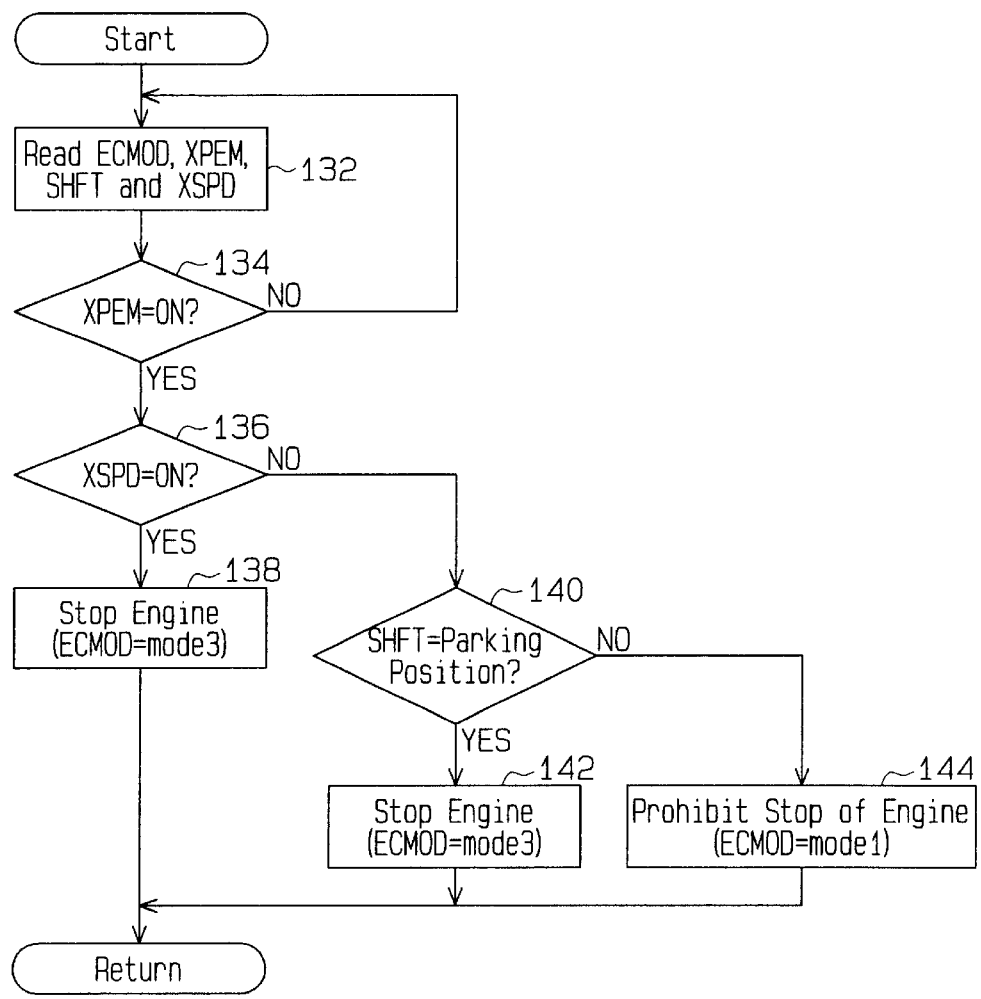
FIG. 4 is a flowchart showing an engine stop procedure executed by the ECU shown in FIG. 1.

FIG. 4 is a flowchart illustrating the engine stop procedure of step 130 in detail. The procedure is executed at predetermined short intervals. When this procedure is started, in step 132, the ECU 46 stores the running state in the RAM for judging whether the automatic stop of the engine is permitted. An eco-run control mode ECMOD, an eco-run condition flag XPEM, the shift position SHFT of the A/T 6, and a vehicle speed historical data flag XSPD are included in the running state. The eco-run control mode ECMOD includes a mode 0, mode 1, mode 2, mode 3, and mode 4. The mode 0 represents a condition in which the key switch 56 is turned on. The mode 1 represents a condition in which the engine 2 is running. The mode 2 represents a condition in which the engine 2 is required to stop. The mode 3 represents a condition in which the engine 2 is stopped. The mode 4 represents a condition in which the engine 2 is automatically started. The eco-run flag XPEM is set to ON when the ECU 46 judges that the automatic stop conditions are satisfied in step 120 of FIG. 2. The vehicle speed historical data flag XSPD is set to ON when the vehicle speed SPD becomes equal to or higher than a predetermined value. The flags XPEM, XSPD are set to OFF, respectively, in the initialization procedure when the engine 2 is started.

In step 134, the ECU 46 judges whether the eco-run condition flag XPEM is ON. When the eco-run condition flag XPEM is ON, the ECU 46 proceeds to step 136, while, when the eco-run condition flag XPEM is OFF, the ECU 46 returns to step 132.

In step 136, the ECU 46 judges whether there is vehicle speed historical data after the start of the engine 2. When the vehicle speed historical data flag XOPD is ON, the ECU 46 judges that there is vehicle speed historical data and proceeds to step 138. When the vehicle speed historical data flag XSPD is OFF, the ECU 46 judges that the vehicle does not have the vehicle speed historical data and proceeds to step 140.

In step 138, the ECU 46 judges that the automatic stop of the engine 2 is permitted, sets the eco-run control mode ECMOD to the mode 3, and stops the engine 2.

In step 140, the ECU 46 judges whether the shift position SHFT is the parking position. When the position SHFT is the parking position, the ECU 46 judges that the automatic stop of the engine 2 is permitted and proceeds to step 142. When the position SHFT is not the parking position, the ECU 46 judges that the automatic stop of the engine 2 is prohibited and proceeds to step 144.

In step 142, the ECU 46 sets the eco-run control mode ECMOD to the mode 3 and stops the engine 2.

In step 144, the ECU 46 sets the eco-run control mode ECMOD to the mode 1 and prohibits the stop of the engine 2. Accordingly, the engine 2 continues running. In this case, the intake negative pressure generated by the running engine 2 is supplied to the brake booster 41, which, in turn, applies sufficient assisting force to the brake pedal 42. In addition, the engine 2 actuates the M/G 26 such that the M/G 26 functions as the generator, which charges the battery 30.

Figure 3:
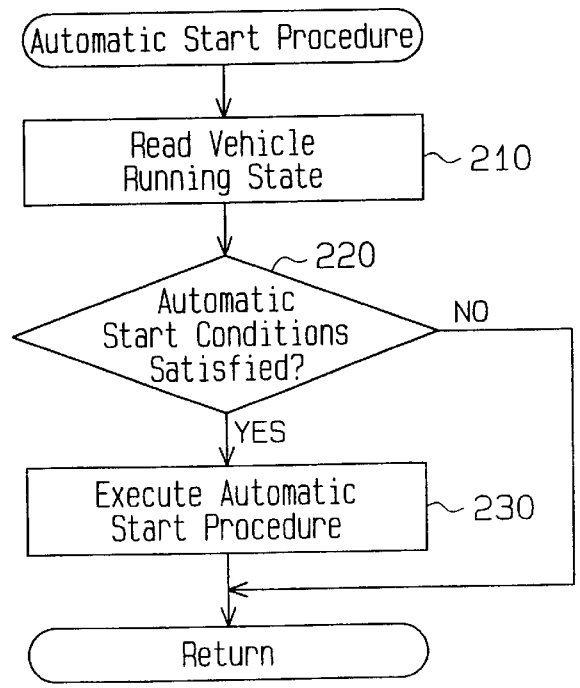
FIG. 3 is a flowchart showing an automatic start procedure executed by the ECU shown in FIG. 1.

FIG. 3 is a flowchart illustrating the automatic start procedure. The procedure is executed at predetermined short intervals. When the automatic start procedure is started, in step 210, the running state of the vehicle is stored in the RAM of the ECU 46 for judging whether the automatic start conditions are satisfied. As above described, the coolant temperature THW, the depression state of the acceleration pedal 39, the voltage of the battery 30, the depression state of the brake pedal 42 and the vehicle speed SPD are included in the running state of the vehicle.

In step 220, the ECU 46 judges whether the automatic start conditions are satisfied based on the running state of the vehicle. The ECU 46 judges that the automatic start conditions are satisfied when one or more of the automatic stop conditions (1) to (5) are not satisfied after the engine 2 is stopped by the automatic stop procedure, and proceeds to step 230. In step 230, the ECU 46 executes the engine start procedure.

The above embodiment has the following advantages.

If the predetermined automatic stop conditions are satisfied and there is vehicle speed historical data after the start of the engine 2, the ECU 46 permits the automatic stop of the engine 2. Further, even when the vehicle does not have the vehicle speed historical data, the ECU 46 permits the automatic stop of the engine 2 if the position of the A/T 6 is the parking position. Therefore, an opportunity for the automatic stop of the engine 2 is increased, which improves fuel economy, while the vehicle may be certainly stopped.

When the vehicle does not have the vehicle speed historical data and the position of the A/T 6 is the neutral position, the ECU 46 prohibits the automatic stop of the engine 2 so that the engine 2 continues running. Therefore, the intake negative pressure generated by the running engine 2 is supplied to the brake booster 41, which, in turn, applies sufficient assisting force to the brake pedal 42.

If the vehicle speed historical data is considered as one of the automatic stop conditions, it should be interpreted that the present embodiment changes the automatic stop conditions according to the shift position of the A/T 6. Specifically, in accordance with the shift position of the A/T 6, the effectiveness of an automatic stop condition concerning the vehicle speed historical data, or the effectiveness of an automatic stop condition concerning the vehicle traveling historical data, is changed. When the A/T 6 is in the parking position, the automatic stop conditions are the easiest to satisfy. Specifically, when the shift position of the A/T 6 is the parking position, the condition concerning the vehicle traveling historical data is eliminated from the automatic stop conditions. In other words, the condition concerning the vehicle traveling historical data is made ineffective.

Figure 5:
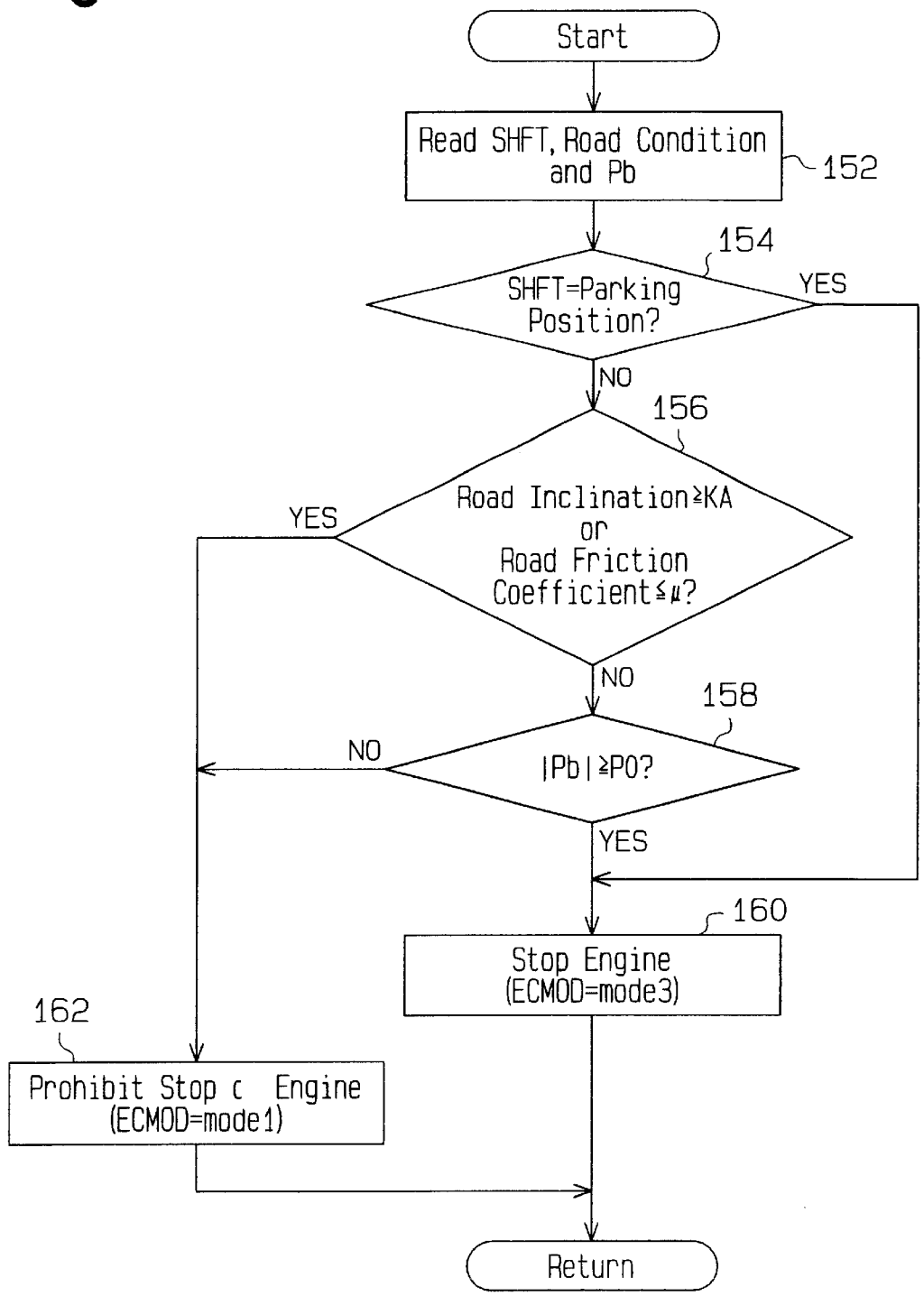
FIG. 5 is a flowchart showing an engine stop procedure executed by an ECU according to a second embodiment of the present invention.

A second embodiment of the present invention will now be described with reference to FIG. 5. The differences between the second embodiment and the first embodiment shown in FIGS. 1 to 4 will be mainly discussed. The second embodiment is different from the first embodiment in that the engine stop procedure shown in FIG. 5 is used instead of the engine stop procedure shown in FIG. 4. In the second embodiment, the road condition is used to judge whether the automatic stop of the engine is permitted.

FIG. 5 is a flowchart illustrating the details of the engine stop procedure in the second embodiment. The procedure is executed at predetermined short intervals. When this procedure is started, in step 152, the running state of the vehicle is stored in the RAM of the ECU 46 for determining whether the automatic stop of the engine is permitted. The running state of the vehicle includes the shift position SHFT, the road condition, and the brake booster pressure Pb. The road condition is represented by the coefficient of friction of the road computed in accordance with the inclination of the vehicle (inclination of the road) detected by the inclination sensor 54 and the signal from the slip detecting sensor 55, which detects the slip of the wheels.

In step 154, the ECU 46 judges whether the shift position SHFT is the parking position. When the shift position SHFT is the parking position, the ECU 46 proceeds to step 156. When the position SHFT is not the parking position, the ECU 46 proceeds to step 162.

In step 156, the ECU 46 judges whether the inclination of the vehicle (inclination of the road) is equal to or greater than a predetermined value KA and whether the coefficient of friction of the road is equal to or smaller than a predetermined value $\mu$. When the inclination of the vehicle is smaller than the predetermined value KA and the coefficient of friction of the road is greater than the predetermined value $\mu$, the ECU 46 judges that the current road hinders the movement of the vehicle, and proceeds to step 158. When the inclination of the vehicle is equal to or greater than the predetermined value KA or the coefficient of friction of the road is equal to or smaller than the predetermined value $\mu$, the ECU 46 judges that the road condition permits the vehicle to move smoothly, and proceeds to step 162.

In step 158, the ECU 46 judges whether the absolute value of the brake booster pressure Pb (negative pressure) is equal to or greater than a predetermined value PO. When the absolute value of the brake booster pressure Pb is equal to or greater than the predetermined value PO, the ECU 46 judges that the brake booster 41 can apply sufficient assisting force to the brake pedal 42 even if the shift position of the A/T 6 is the neutral position, and proceeds to step 160. When the absolute value of the brake booster pressure Pb is smaller than the predetermined value PO, the ECU 46 proceeds to step 162.

In step 160, the ECU 46 judges that the automatic stop of the engine 2 is permitted, sets the eco-run control mode ECMOD to the mode 3 and stops the engine 2.

In step 162, the ECU 46 judges that the automatic stop of the engine 2 is prohibited, sets the eco-run control mode ECMOD to the mode 1 and prohibits the stop of the engine 2. Accordingly, the engine 2 continues running. In this case, the intake negative pressure generated by the running engine 2 is supplied to the brake booster 41, which in turn applies sufficient assisting force to the brake pedal 42. In addition, the engine 2 actuates the M/G 26 such that the M/G 26 functions as the generator, which charges the battery 30.

The above embodiment has the following advantages.

The ECU 46 performs the automatic stop of the engine 2 when various conditions are satisfied. A condition of the road that hinders the vehicle movement is one of these conditions. However, when the shift position of the A/T 6 is the parking position, the ECU 46 permits the automatic stop of the engine 2 regardless of the road condition. Therefore, an opportunity for the automatic stop of the engine 2 is increased, which improves fuel economy, while the vehicle is reliably maintained stopped.

The ECU 46 prohibits the automatic stop of the engine 2 and keeps the engine 2 running when the shift position of the A/T 6 is the neutral position and the road condition is judged to permit the vehicle to smoothly move. Therefore, the intake negative pressure generated by the running engine 2 is supplied to the brake booster 41, which, in turn, applies sufficient assisting force to the brake pedal 42.

It should be apparent to those skilled in the art that the present invention may be embodied in many other specific forms without departing from the spirit or scope of the invention. Particularly, it should be understood that the invention may be embodied in the following forms.

In each of the above embodiments, the M/G 26 automatically starts the engine 2 after the automatic stop of the engine 2. However, the starter 48 may automatically start the engine 2 after the automatic stop of the engine 2.

In the first embodiment, the ECU 46 judges whether there is vehicle speed historical data after the start of the engine 2, and uses the result of the judgment as one of the automatic stop conditions of the engine 2. Alternatively or in addition, the ECU 46 may use whether the signals from the output shaft speed sensor 32 and the coolant temperature sensor are continually input as one of the automatic stop conditions of the engine 2.

In the second embodiment, the coefficient of friction of the road may be calculated with the slip ratio obtained immediately before the vehicle stops. The slip ratio is computed in accordance with the difference between the speed of the drive wheels and the speed of the driven wheels.

In the second embodiment, the road condition may be estimated based on the movement of the vehicle when the shift position of the A/T 6 is switched to the parking position. The movement of the vehicle may be judged, for example, in accordance with the signals from the acceleration sensor.

In the first embodiment, whether there is vehicle speed historical data after the start of the engine 2 is used as one of the conditions for the automatic stop of the engine 2. However, instead of this condition, whether the vehicle has traveled after the start of the engine 2 may be used as one of the conditions for the automatic stop of the engine 2. In this case, the automatic stop condition concerning the vehicle traveling historical data may be determined to be satisfied when the distance traveled by the vehicle after the start of the engine 2 reaches a predetermined determination value. Further, the determination value may be changed according to the shift position of the A/T 6.

In the first embodiment, the condition concerning the vehicle speed historical data, or the condition concerning the vehicle traveling historical data, is used as the automatic stop condition that is changed according to the shift position of the A/T 6. In the second embodiment, the condition concerning the road condition is used as the automatic stop condition that is changed according to the shift position of the A/T 6. However, both of the conditions concerning the vehicle traveling historical data and the road condition may be used. That is, the automatic stop condition that is changed according to the shift position of the A/T 6 may be changed as long as at least one of the conditions concerning the vehicle traveling historical data and the road condition is used.

Therefore, the present examples and embodiments are to be considered as illustrative and not restrictive and the invention is not to be limited to the details given herein, but may be modified within the scope and equivalence of the appended claims.

What is claimed is:

1. An automatic stop controlling apparatus for automatically stopping an engine, the engine being mounted on a vehicle and coupled to an automatic transmission, wherein the automatic transmission has a plurality of shift positions, the apparatus comprising:
   a sensor for detecting the state of the vehicle; and
   a controller for controlling the engine, wherein, when it is judged that predetermined automatic stop conditions are satisfied based on the state of the vehicle, the controller stops the engine, and wherein the controller changes the automatic stop conditions in accordance with the shift position of the automatic transmission, the automatic stop condition to be changed being related to at least one of traveling historical data of the vehicle and the road condition.

2. The automatic stop controlling apparatus according to claim 1, wherein, when the shift position of the automatic transmission is the parking position, the automatic stop conditions are changed to be the easiest to satisfy.

3. The automatic stop controlling apparatus according to claim 1, wherein the automatic stop condition to be changed is related to the vehicle traveling historical data.

4. The automatic stop controlling apparatus according to claim 3, wherein the controller changes effectiveness of the automatic stop condition related to the vehicle traveling historical data in accordance with the shift position of the automatic transmission.

5. The automatic stop controlling apparatus according to claim 1, wherein the automatic stop condition to be changed is related to the road condition.

6. The automatic stop controlling apparatus according to claim 1, wherein the automatic stop conditions include a first condition related to the current state of the vehicle and a second condition related to at least one of the vehicle traveling historical data and the road condition, and wherein, when the shift position of the automatic transmission is the parking position, the controller excludes the second condition from the automatic stop conditions.

7. The automatic stop controlling apparatus according to claim 6, wherein, when the shift position of the automatic transmission is a position other than the parking position, the controller stops the engine only if the first condition and the second condition are satisfied.

8. The automatic stop controlling apparatus according to claim 6, wherein, when the shift position of the automatic transmission is the neutral position, the controller prohibits the stop of the engine if the second condition is not satisfied.

9. The automatic stop controlling apparatus according to claim 6, wherein, when the vehicle speed is equal to or greater than a predetermined value after the start of the engine, the controller judges that the second condition is satisfied.

10. The automatic stop controlling apparatus according to claim 6, wherein, when the road condition hinders the movement of the vehicle, the controller judges that the second condition is satisfied.

11. The automatic stop controlling apparatus according to claim 6, wherein, when the inclination of the road is less a predetermined value, the controller judges that the second condition is satisfied.

12. The automatic stop controlling apparatus according to claim 6, wherein, when the coefficient of friction of the road is greater than a predetermined value, the controller judges that the second condition is satisfied.

13. An automatic stop controlling apparatus for automatically stopping an engine, the engine being mounted on a vehicle and coupled to an automatic transmission, wherein the automatic transmission has a plurality of shift positions, the apparatus comprising:

a sensor for detecting the state of the vehicle; and a controller for controlling the engine, wherein, when it is judged that predetermined automatic stop conditions are satisfied based on the state of the vehicle, the controller stops the engine, wherein the automatic stop conditions include a first condition related to the current state of the vehicle and a second condition related to at least one of traveling historical data of the vehicle and the road condition, and wherein, when the shift position of the automatic transmission is a predetermined shift position, the controller excludes the second condition from the automatic stop conditions.

14. The automatic stop controlling apparatus according to claim 13, wherein the second condition is related to the vehicle traveling historical data.

15. The automatic stop controlling apparatus according to claim 13, wherein the second condition is related to the road condition.

16. A method for controlling an automatic stop of an engine, the engine being mounted on a vehicle and coupled to an automatic transmission, wherein the automatic transmission has a plurality of shift positions, the method comprising:

detecting the state of the vehicle;

stopping the engine when it is judged that predetermined automatic stop conditions are satisfied based on the detected state of the vehicle; and changing the automatic stop conditions in accordance with the shift position of the automatic transmission, the automatic stop condition to be changed being related to at least one of traveling historical data of the vehicle and the road condition.

17. The method according to claim 16, wherein changing the automatic stop conditions comprises changing the automatic stop conditions to be the easiest to satisfy when the shift position of the automatic transmission is the parking position.

18. The method according to claim 16, wherein the automatic stop condition to be changed is related to the vehicle traveling historical data.

19. The method according to claim 18, wherein changing the automatic stop conditions comprises changing effectiveness of the automatic stop condition related to the vehicle traveling historical data in accordance with the shift position of the automatic transmission.

20. The method according to claim 16, wherein the automatic stop conditions includes a first condition related to the current state of the vehicle and a second condition related to at least one of the vehicle traveling historical data and the road condition, wherein changing the automatic stop conditions comprises excluding the second condition from the automatic stop conditions when the shift position of the automatic transmission is the parking position.

21. The method according to claim 20, wherein changing the automatic stop conditions comprises including the first condition and the second condition in the automatic stop conditions when the shift position of the automatic transmission is a position other than the parking position.

22. The method according to claim 20, further comprising prohibiting the stop of the engine if the second condition is not satisfied when the shift position of the automatic transmission is the neutral position.

23. The method according to claim 20, further comprising judging that the second condition is satisfied when the vehicle speed is equal to or greater than a predetermined value after the start of the engine.

24. The method according to claim 20, further comprising judging that the second condition is satisfied when the road condition hinders the movement of the vehicle.

25. The method according to claim 20, further comprising judging that the second condition is satisfied when the inclination of the road is less a predetermined value.

26. The method according to claim 20, further comprising judging that the second condition is satisfied when the coefficient of friction of the road is greater than a predetermined value.

27. A medium, which is readable by a computer and has within it a program for automatically stopping an engine, the engine being mounted on a vehicle and coupled to an automatic transmission, wherein the automatic transmission has a plurality of shift positions, and wherein the program causes the computer to execute the following procedures:

detecting the state of the vehicle;

stopping the engine when it is judged that predetermined automatic stop conditions are satisfied based on the detected state of the vehicle; and changing the automatic stop conditions in accordance with the shift position of the automatic transmission, the automatic stop condition to be changed being related to at least one of traveling historical data of the vehicle and the road condition.

28. The medium according to claim 27, wherein changing the automatic stop conditions comprises changing the automatic stop conditions to be the easiest to satisfy when the shift position of the automatic transmission is the parking position.

29. The medium according to claim 27, wherein the automatic stop condition to be changed is related to the vehicle traveling historical data.

30. The medium according to claim 29, wherein changing the automatic stop conditions comprises changing effectiveness of the automatic stop condition related to the vehicle traveling historical data in accordance with the shift position of the automatic transmission.

* * * * *

UNITED STATES PATENT AND TRADEMARK OFFICE
CERTIFICATE OF CORRECTION

PATENT NO.    : 6,676,565 B2
DATED         : January 13, 2004
INVENTOR(S)   : Koichi Mizutani It is certified that error appears in the above-identified patent and that said Letters Patent is hereby corrected as shown below:

Title page,
Item [73], Assignee, replace "Tokyo" to -- Toyota --.

Signed and Sealed this

Eighteenth Day of May, 2004

JON W. DUDAS
*Acting Director of the United States Patent and Trademark Office*